United States Patent [19]

Stut et al.

[11] 3,908,077

[45] Sept. 23, 1975

[54] METHOD FOR THE DETERMINATION AND/OR CONTROL OF DIMENSIONS OF AN OBJECT BEING SUPERVISED BY AN ELECTRONIC CAMERA

[75] Inventors: Hans Stut, Grobenzell; Hans Leo Stiegler, Munich, both of Germany

[73] Assignee: Siemens Aktiengesellschaft, Berlin & Munich, Germany

[22] Filed: Oct. 24, 1973

[21] Appl. No.: 409,250

[30] Foreign Application Priority Data

Nov. 2, 1972 Germany ............................ 2253789

[52] U.S. Cl. .............. 178/6.8; 178/6; 178/DIG. 36; 178/DIG. 1

[51] Int. Cl.[2] ............................................ H04N 7/02

[58] Field of Search ..... 178/DIG. 36, 6, 6.8, DIG. 1

[56] References Cited

UNITED STATES PATENTS 3,679,820 7/1972 Montone ................................ 178/6

OTHER PUBLICATIONS

Circom Micro Technology "Metrology System" 2-27-73.

*Primary Examiner*—Howard W. Britton
*Assistant Examiner*—Edward L. Coles
*Attorney, Agent, or Firm*—Hill, Gross, Simpson, Van Santen, Steadman, Chiara & Simpson

[57] ABSTRACT

In determining and controlling the dimensions of an object being supervised by an electronic television camera, such as in floating zone melting of a semiconductor rod, measuring marks are created electronically on the picture screen of a television reproduction unit. The measuring marks are mobile on the screen and displayed simultaneously with the image of the object so that adjustments may be effected by moving the measuring marks to concide with the edges of the image. The marks can be created by a filed stop in the recording of the television camera or by means of additional modulation of the electron beam which scans the picture in the camera or the electron beam which reproduces the picture on the monitor screen. Movement of a mark, or marks relative the respective edge or edges of the image of the object forms the basis for a comparison of the change to a calibrated change assigned to the dimension to obtain a result which may be utilized to reposition the semiconductor rod and thus the molten zone to a desired position, or to otherwise effect a desired condition.

2 Claims, 9 Drawing Figures

METHOD FOR THE DETERMINATION AND/OR CONTROL OF DIMENSIONS OF AN OBJECT BEING SUPERVISED BY AN ELECTRONIC CAMERA

BACKGROUND OF THE INVENTION

1. Field of the Invention

This invention relates to a method for determining and/or controlling dimensions of an object being supervised, and more particular to such a method of wherein a picture or image of the object is recorded by an electronic television camera and produced, preferably simultaneously with recording, on an electron monitoring spring.

2. Description of the Prior Art

A method of the general type described above is disclosed in the German Pat. application No. P 2.1 13 720.2 entitled "Method For Floating Zone Melting." In the method, the electronic camera is a television recording camera, the electronic screen is one of conventional television reproduction units and the object is a melting zone, the size of which and therefore the stability of which are to be supervised. Also, in the case of the present invention, the floating zone melting of semiconductor rods constitutes the primary field of the application, although further application possibilities are provided.

The afore-mentioned method may be carried out in that simultaneously with the picture of the object being supervised, for example a crucible-free mounted melting zone, a measuring scale corresponding to the correct scale of the object is arranged on the reproduction screen in order to thereby make it possible to read the true dimensions of the object directly. According to our experience, this method may lead to inaccuracies and does not allow an automatic evaluation of the process.

SUMMARY OF THE INVENTION

The present invention suggests that the electronic television camera be first brought into such a position with respect to the object that the required dimensions are oriented transversely of the optical axis on the side of the object of the recording optic of the electronic camera. Furthermore, and simultaneously with the picture of the object, a measuring mark M which is shiftable in a defined manner across the electronic screen of a monitored unit is created electronically and is subsequently brought into coincidence with the two end points of picture D′ of the required dimension D of the object. In addition, the required change of the adjustment of the apparatus fixing the position of the measuring mark M on the screen, in particular electronic apparatus, is compared with a calibrated change of the adjustment of the apparatus assigned to a known transverse distance $s$ at the distance of the object from the recording optic of the electronic camera. Finally, from the result of this comparison, preferably an electronic comparison, the actual value of the dimension D is determined.

Since generally the picture D′ of the dimension D which is to be determined is recorded on the screen of a reproduction unit actually only corresponds to the projection of dimension D onto a plane which is perpendicularly oriented with respect to the optical axis on the object side of the recording unit, the first of the measures to be applied becomes directly understandable. If it was disregarded, only the value of D sin would be determined from the picture D′, whereby the angle lies between dimension D and the optical axis.

Furthermore, in case of the devices which are to be used according to the invention (electronic recording camera and electronic picture reproduction unit) a distance D which is oriented transversly with respect to the optical axis of the recording camera will provide a much larger picture D′ in cases of equal distance between the dimension D and the electronic recording camera on the electronic screen of the reproduction unit, the larger the distance D is in reality. In addition, it can be correctly assumed that proportionality between the values of D and D′ is achieved, at least if the picture of the object appears in the central part of the screen.

If the measuring mark M passes the comparison distance s on the electronic reproduction screen, which results at the location of the object for the recording of the calibration distance $s$, a defined change of the adjustment of an adjusting means which determines the position of the measuring mark M on the reproduction screen becomes necessary. The adjusting means are nothing else but means providing adjustment parameters which fix the position of the measuring mark M on the screen, whereby the number of the adjustment parameters can correspond to the number of the degrees of freedom for the mobility fo the measuring mark M on the electronic reproduction screen. If the measuring mark M can only be moved along a straight line, which preferably leads through the center of the reproduction screen obviously only one adjustment means will be required. This means that also only one adjustment parameter p defining the position of the measuring mark M on the reproduction screen is provided. If, however, the measuring mark M is shiftable on the screen into two different dimensions, which means, for example, an $x$ and a $y$ direction, special adjustment means determining the $x$ position and one determining the y position may be provided so that two adjustment parameters $p_x$ and $p_y$ will be utilized accordingly.

This applies in particular if the measuring mark M is created by a field stop which is faded into the beam passage of the recording optic of the electronic television camera and is perpendicularly shiftable with respect to its optical axis in a defined manner. In this case, it is also necessary that the adjustment (referred to the zero position) of the adjustment means which determines the position of the measuring mark M of recordingly, which means that the values of the adjustment parameters become proportional to their assigned change of position of the measuring mark M of the electronic screen. However, it is the most important feature of the invention that the measuring mark M is created by electrical pulses, by means of which the electron beam is modulated in the electronic recording camera and/or the electron beam in the reproduction unit is so modulated. In this case, at least a sequence of periodic pulses is provided which causes the electron beam of the reproduction unit to write the measuring mark M on the screen adjacent to the picture of the object being supervised; or, however, a second electron beam may be provided which only serves to create the measuring mark on the screen. The first possibility can be achieved without difficulty by means of the available devices which are presently marketed; whereas, the second possibility necessitates the application of a television reproduction tube which is provided with two electron beams which can be independently controlled. In the following observations, the first case will be dealt with in detail.

Provided there is proportionality between the shifting of the measuring mark M on the screen of the electronic reproduction unit and the change causing this shifting of the adjustment parameter p assigned to the shifting, the following proportionality will apply.

$$1.\ D:D' = s:s'$$

and the proportionality $$2.\ D:s = p(D'):\ p(s'),$$

whereby $p(D')$ is the change of the adjustment parameter p which is necessary so that the measuring mark M passes on the screen through the picture D′ of the dimension D to be controlled;
whereas $p(s')$ constitutes the change of the same parameter which is necessary so that the mark M can pass through the picture $s'$ of the calibration distance.

If the distance between the electronic camera and to the supervised object is kept constant according to equation (2), the relationship $$3.\ D = p(D')\ .\ f$$

wherein $f = s:\ p(s')$ is a constant factor. If, however, this distance is changed the value f will have to be redetermined.

In the evaluation of equation (3) according to the circumstances, we are primarily dealing with the determination of the change of parameter $p$ which is necessary for passing of the distance D′-which is generally presumed to be a straight line. If the measuring mark M can only be moved straight in one dimension, for example, a horizontal line across the screen, in any case only one adjustment parameter will be employed. In that case, it has to be provided that the picture of the dimension D coincides with the path on the screen which is accessible to the measuring mark M. This possibility can be realized by means of the mark of a field stop (for instance being arranged in the optic of the recording camera) and being shiftable perpendicularly to the optical axis in one dimension, or an electronic picture reproduction tube which contains two electron beams which can be controlled independently.

However, both possibilities principally also easily allow two dimensional control of the mobility of the measuring mark M on the picture reproduction screen. For example, the mark which optically creates the mark M may be constructed on the field stop in the recording camera in accordance with the principle of a crosser structure and can therefore be moved into two directions which are oriented perpendicularly to each other, i.e. an $x$ direction and y direction. Consequently, also the measuring mark M will be mobile on the screen in a $x$ and a $y$ direction. In the interest of a simple evaluation, it will be provided that the adjustment means which are independent from each other and serve the mobility of the mark M in the $x$ direction and the mobility of the mark M in the $y$ direction receive exactly the same adjustment sensitivity so that the adjustment parameters $p_x$ and $p_y$ which are assigned to the adjustment means control the mobility of the measuring mark in the same manner. This means that the following relationship should always apply:

$$dx/dp_x = dy/dp_y.$$

Furthermore, $f_x$ should be equal to $f_y$ and $f$. In that case the more simple equation (3) is replaced by the following equation $$4.\ D = f \cdot \sqrt{[p_x(D'_x)]^2 + [p_y(D'_y)]^2},$$

wherein $D'_x$ constitutes the component of the value D′0 in the x direction and $D'_y$ component in the y direction.

Principally, the described method can also be used in order to determine the size of distances D which are not rectilinear.

For a distance which is comprised of straight-lined portions, the following relationship applies when generalizing (4)

$$D = \sum_{\gamma} D_\nu = f \cdot \sum_{\nu} \cdot \sqrt{[p_x(D'_{\nu\ x})]^2 + [p_y(D'_{\nu\ y})]^2},$$

wherein $p_x(D'_{\nu\ x})$ and $p_y$ and $p_y(D'_{\nu y})$ relate to the changes of the parameter $p_x$ and $p_y$, respectively, which are necessary so that the measuring mark M can pass through the picture D′ of the $\nu$ of the distance $D_\nu$ .

Incidentally, it may be noted that a curved distance can be treated in a similar manner. The picture D′ which is similar to the course of the trace D is replaced on the reproduction screen by a sufficiently fine chord traverse whereby the individual chords correspond to equal abscissa which are lined up or likewise to ordinate sections. The respective differences $\Delta p_x$ and $\Delta p_y$ are quartered, and the root is formed from the sum of squares which is then multiplied with the factor $f$. In the case of a sufficiently fine division, the value of D is obtained with the desired accuracy.

The control of the movement of the measuring mark M on the picture reproduction screen must be carried out in such a way that the mark M passes through the picture D′ of the controlled distance D from the beginning to the end. The necessary operation and supervision of the adjustment means is carried out in the simple manner by an observer who manually performs the required changes of the adjustment parameters $p_x$ and $p_y$, controls them visually and evaluates the same. However, it is advantageous to have an automatic control for performing these functions. In the following, are the various possibilities of such automatic control are described.

It is to be understood that the means which register the respective position of the adjustment means depend on the physical nature of the adjustment means. These supervisory means must become active as soon as the mark M coincides with the beginning of the picture D′. A primary possibility is provided by the fact that, based on the electronic mode of creation of the measuring mark M, it superimposes itself optically onto the picture D′ of object D so that the brightness of the mark M will experience a distinct increase or decrease at the beginning or the end of coincidence, which the brightness changes are then utilized for the control of suitable supervisory apparatus, for example photo cells, photo diodes or photo transistors, possibly with switching characteristics. These supervisory devices activate the control of the adjustment parameters p or $p_x$ and $p_y$, respectively, or switch adjustment off. Finally, this control of the adjustment parameters is coupled with an electronic arithmetic unit which evaluates the changes of the parameters p or $p_x$ and $p_y$, respectively, having been determined by the supervisory means as set forth above.

The automatic control of the measuring mark M on the picture reproduction screen is simply accomplished if the picture D' is a straight line. If, for instance, only the parameter $p_x$ is operated, the measuring mark M will travel along a horizontal line and across the screen; whereas an operation of the parameters $p_y$ means a shifting of the measuring mark M along a vertical line. If, for example, the determination of the diameter of the melting zone in a floating zone melting of a vertical semiconductor rod is concerned, the parameter $p_y$ can remain fixedly adjusted, while the parameter $p_x$ is varied in such a way that the measuring mark M travels across the picture of the molten zone. Since the radial surroundings of the molten zone are usually considerably darker than the melting zone itslef, the measuring mark M will experience a distinct brightening when entering the picture Z' of the melting zone Z and a distinct darkening when leaving this picture. The movement of the measuring mark M can, in this case, for example, be caused by an electromotor which replaces the manual operation of the adjustment means, for example one or two adjusting screws, potentiometers, levers or other known means for an automated operation.

The automatic control of the mark guidance becomes more difficult if the distance D, and consequently also its image D', does not correspond to a straight-line distance. However, here also ways can be found which, however, require a considerably greater technical effort. For this reason, such will only be mentioned briefly. They require that the picture D' of the object dimension D be automatically scanned on the screen of the reproduction unit and that the result is used for the controlled operation of the parameters $p_x$ and $p_y$. At the same time, these means must be connected with the evaluation of the change of the adjustment of these parameters.

It is clear that by a respectively programmed operation of the parameters $p_x$ and $p_y$ the measuring mark M can pass across a screen of the reproduction unit in any desired way.

In the case of a two-dimensional adjustment control of the movement of the measuring mark M, with parameters $p_x$ and $p_y$, can as indicated above, be achieved without difficulty by utilizing a field stop which is perpendicularly shiftable with respect to the optical axis of the recording optic in the electronic camera along two directions which are perpendicular to each other. Such a field stop is, for example, equipped with a dark or illuminated cross wire whose picture then defines the measuring mark M on the screen of the reproduction unit.

Another possibility is provided through the utilization of a second electron beam in the picture tube of the reproduction device. The first electron beam is scanned by the recording camera; whereas, the second electron beam exclusively serves for the creation of the measuring mark M which is provided by the impinchment location of the second electron beam on the picture screen of the reproduction tube. An electro-static and/or electro-magnetic control of the second electron beam, for example, by means of a pair of $x$ and $y$ deflection plates or deflection coils, which are specifically assigned to the second electron beam, provides that the location of the second electron beam on the screen can be directed to any point on the picture screen of the reproduction device independently of the first electron beam which writes the picture of the supervised object. The voltage at the x deflection plates of the second electron beam results in the parameter $p_x$ and the voltage at the y deflection plates result in the parameter $p_y$. The coincidence of the two electron beams effects an amplification of luminance on the picture screen of the reproduction device which becomes more intensive with increasing brightness of the two electron beams striking the same spot.

If, for example, the picture of a melting zone during floating zone melting of a silicon rod is written by the first electron beam, and the intensity of the second electron beam writing the measuring mark M is maintained at a constant level, a superimposition of the effect of both electron beams will occur on the picture screen when the electron beams hit the same location, which necessarily must result in a greater brightness of the measuring mark M than would be the case in the absence of the electron beam writing the picture of the object. If the coincidence occurs at bright points of the picture, that is in the picture of the bright melting zone, the resulting brightness of the measuring mark M will be noticably larger that would be the case if the measuring mark passes on the picture of the dark background of the melting zone. The brightness increase or brightness decrease, respectively, which is caused during the crossing of the picture of the melting zone by the measuring mark M cannot only be registered visually, but also by respective electron-optical instruments and can be utilized for the automatic activation, respectively, of the instruments registering and evaluating the changes of the parameters $p_x$ and $p_y$ during the passing of the picture of the melting zone.

Instead of a scanning with opto-electronic means, a measuring search electrode can be arranged at the picture screen of the reproduction device, which electrode is capable of reacting to local, in particular, pulse-like changes of the current density in the reproduction screen. Such a measuring search electrode can, for example. consist of a small, multi-wound induction coil which is arranged at the outside of the screen approximately at the location of the melting zone picture on the screen, which reacts to the changes in the current density in this area in the conductive picture screen. The second electron beam creating the measuring mark M is dimensioned in intensity in such a way that the difference of a superimposition of the impinchment spots of both electron beams on the area outside of the melting zone picture and on the area within the melting zone picture becomes quite obvious. In addition, the impinchment spots of both electron beams will be adjusted approximately equally large. A coincidence of both electron beams is always visually provided if the electron beam (usually un-modulated) writing the mark M rests on the picture line which is written at the same instant by the first electron beam which writes the picture. The coincidence of both electron beams does not only result in a liminance pulse on the reproduction screen, but also at the same time in a current density pulse at the impinchment point on the picture reproduction screen. This pulse can be scanned by a probe or can be registered by means of a measuring search electrodal probe which has previously been arranged in proximity of the coincidence. Since the level of the pulses becomes substantially greater during the resting of the measuring mark M in the picture field of the melting zone, and therefore, the pulses become steeper than would be the case if the measuring mark M were located in the image field of the dark radial surroundings of the melting zone, here also the moment can be determined at which the measuring mark M enters or leaves the image field of the melting zone.

In the following paragraphs, the most important case of the method according to the invention is set forth, whereby the electron beam writing the picture is scanned by additional electrical pulses in such a way that a measuring mark M appears on the screen of the reproduction device. For this purpose two possibilities are available which can be used individually, or in combination with each other:

1. The electrical pulses have a direct effect on the electron beam writing the picture in the reproduction tube on the picture screen (FIG. 1).

2. The electrical pulses are already effective on the electron beam scanning the picture of the object which is projected by the optic of the electronic camera onto the target of the recording tube (FIG. 2).

The simultaneous application of these two features is possible as can be directly realized, constitutes a manner for simultaneously creating two different measuring marks $M_1$ and $M_2$ on the picture reproduction screen.

BRIEF DESCRIPTION OF THE DRAWINGS

Other objects, features and advantages of the invention, its organization, construction, and operation, will be best understood from the following detailed description of preferred embodiments of the invention, taken in conjunction with the accompanying drawings, on which.

DESCRIPTION OF THE PREFERRED EMBODIMENTS

Figure 1:
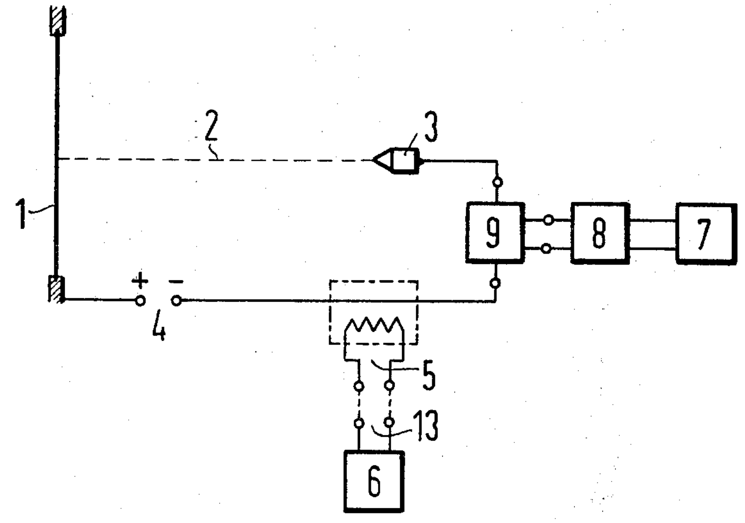
FIGS. 1 and 2 illustrate apparatus and described modes of operation for practicing the present invention.

In FIG. 1, a picture screen 1 of a reproduction device consists of or provided with a layer of material capable of luminance. The reference 2 refers to the picture of an object and the electron beam writing the picture of the object and the measuring mark M which is "contacted" on the one hand by the conductive luminescent layer of the picture screen 1 and, on the other hand, by a cathode 3 of the picture tube of the reproduction device which emits the electron beam 2. A high voltage direct current source 4 is provided in the electron beam circuit which creates electron beam 2. Therefore, a current flows which corresponds to the electrical load per second in the electron beam 2, which is modulated by pulses supplied by an electronic recording camera 6, for example by way of an input 5 of the reproduction device, and is also influenced on the other hand by pulses which create the measuring mark M by way of a coupling member 9.

Based on the modulation of the electron beam 2 by the current supplied from the electronic recording camera 6 in connection with a respectively known guidance of the electron beam 2, the picture of the object and thus the picture D′ of the dimension D to be determined or written on the picture screen in synchronism with the guidance of an equivalent electron beam in the electronic recording camera.

A pulse generator 7, which supplies periodic (if necessary also almost periodic) and equal pulses, operates on a delay member 8, which may be an adjustable member, and thereby on the coupling member 9 and on the circuit containing the electron beam 2. If the period $\pi$ of these pulses accurately corresponds to the duration $T_B$ of the picture cycle on the reproduction screen, a stationary brightening or darkening in the form of a stationary mark M is created by the pulses depending on their sign. If the period $\pi$ of these pulses changes with respect to the duration $T_B$, the mark will successively travel either in a writing direction or opposite to the writing direction through one picture line after another and finally pass through the entire picture. A brightening of the mark M is obtained if the voltage and/or current itensity experiences an amplification in the electron beam 2 caused by the pulse sequence, and a darkening occurs these magnitudes are weakened by the pulses.

Figures 2, 3:
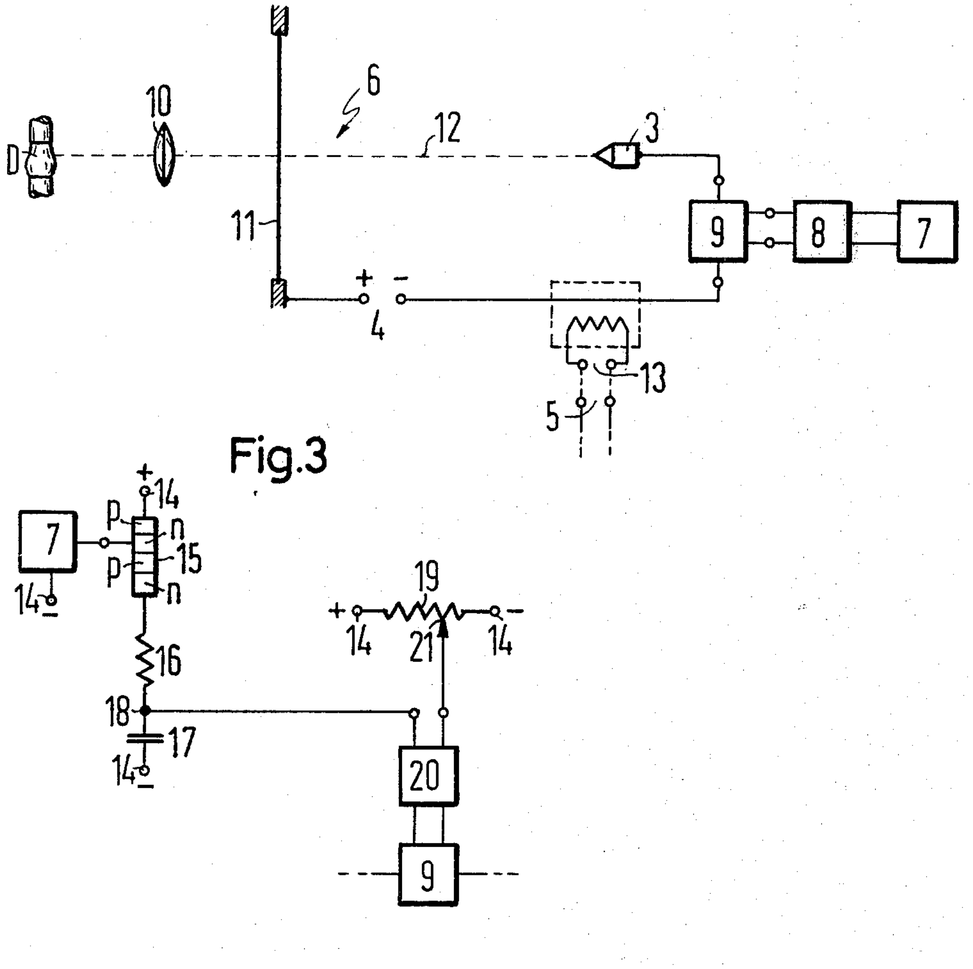
FIG. 3 is a schematic circuit illustration of a delay circuit for use in practicing the present invention.

In an analogous manner, the electron beam can also be scanned by pulses in the electron recording tube 6. These conditions are illustrated in FIG. 2. The light emitted from the object D serves for the recording of the object by the lens 10 onto a target 11, wherein the picture and the information contained thereby are stored, for example, in the form of an electro-static load distribution, and by which the electron beam 12 of the electronic recording camera which linearly scans the target 11 is canceled linearly. The electron beam 12 receives a modulation corresponding to this load. The electron beam 12 now forms a part of an outer circuit which conducts a current that is modulated by the picture of the object D and which supplies a correspondingly modulated voltage at an electrical output 13 of the electronic camera 6. This output is then applied for charging of the reproduction device at its input 5. It then modulates the electron beam 2 of the reproduction device which writes the picture on the reproduction screen in a linear manner and runs synchronously with respect to the electron beam 12 in the recording camera 6. Because of the short duration of a picture writing and picture scanning cycle $T_B$ and the continuity of the entire process, the picture will appear on the reproduction screen as a coherent picture, in particular since also the luminance of the picture screen locally stimulated by the electron beam 2 requires a long time in comparison with the duration $\tau$ of the writing line in order to die out. Also, a pulse supply 7 is provided similar to that in FIG. 1.

Since the electron beam 2 is additionally influenced with the information of the measuring mark M, either by a pulse generator 7 directly coupled with the reproduction device or by a pulse generator which is coupled with the electronic recording camera, the electron beam 2 will reflect a measuring mark M which is created by the pulses.

Two periods are important for the aforementioned possibility of the method according to the present invention, namely, the picture scanning or picture writing duration $T_B$, respectively, and the scanning or writing duration $\tau$ per line. If there are a total of n lines, the period $T_B$ will correspond to $n.\tau$, whereby $\tau$ as well as the period $T_B$ are each of a constant magnitude ($\tau$ is the total of the writing duration per line including the duration of the return of the electron beam to the following line). To give a complete explanation, it should be mentioned that here also, as is generally common in television technique the individual picture writing cycles or picture scanning cycles, respectively, line up without interval so that the two electron beams 2 and 12 moved synchronously start directly after passing the last picture line of the respective previous picture cycle directly with the passing of the first line of the respective following cycle. The pulse generators 7 only create periodically short pulses whose duration should only amount to a fraction of the time $\tau$ which is necessary for the scanning or writing, respectively, of a picture line in the camera 6 or the reproduction tube of the reproduction device, respectively. These pulses have, for example, the period $\pi = (T_B + a)$ wherein a is an adjustable magnitude. The voltage U of the pulse sequence is provided by a function $U = f(t)$, and its current intensity is provided by a function $I = g(t)$, wherein $t$ refers to time. The secondary condition $f(t + \pi) = f(t)$, $g(t + \pi) = g(t)$ applies irrespective of the adjusted magnitude a as long as the value a is maintained. If a equals 0, a stationary measuring mark will be created due to the sequence of equidistant pulses. If, however, the value a is provided a fixed positive or negative value, the mark M will run corresponding to the absolute amount of the value a with more or less speed into one or another direction along the lines of the television picture on the reproduction device screen until it finally crosses the entire image field of the reproduction device. It is obvious that the magnitude a is not suited as an adjustment parameter p.

If, however, the pulse sequences of the generators is applied by way of a delay circuit 8, adjusting a defined phase angle $\phi$ between the pulses, being equidistant with the period $T_B$ of the superposed pulse sequence, and the body fixing the picture writing cycles with the duration $T_B$ to the circuit containing the electron beam 2 or 12, respectively, the required process is achieved. The delay circuit 8 which defines the phase angle $\phi$ between the pulses of the superposed pulse sequence, on the one hand, and the pulses on controlling the picture reproduction cycle of the electron beams 2 and 12, respectively, on the other hand, correctly defines an adjustment parameter p in the sense of the present invention. The circuit illustrated in FIG. 3, for example, may serve as a suitable delay circuit in a simplified manner.

The pulses produced by the pulse generator 7 with the frequency of the picture writing cycles $T_B^{-1}$ operate a 3-pole electronic switch 15, for example, a switching transistor or a switching thyristor (Triac). This switching device is connected in series with a fixed resistor 16 and a load capacitor 17 to a direct current voltage source 14. A tapping point 18 is provided is provided between the fixed resistor 16 and the load capacitor 17, which point is connected to the input of a differential amplifier 20. The second input of the differential amplifier is connected to a tap 21 of a potentiometer 19 which is connected in parallel to the series circuit just described. The adjustment parameter p forms the position of the potentiometer tap 21 and determines the phase angle $\phi$. Depending on the position of the tap 21, the pulses which are to be received at the output of the differential amplifier appear with a delay with respect to the pulses of the generator 7 which activate the switch 15. The pulses occurring at the output of the differential amplifier 20 are directed for scanning of the electron beam 2 or the electron beam 12, respectively, by way of the coupling member 9. Depending on the adjusted delay, the phase angle $\phi$ also will be changeable with respect to the picture reproduction cycle and the measuring mark M which is created by the pulses will experience an adjustable shifting along the individual lines, which — contrary to a shifting by the above defined magnitude a — is clearly assigned to its designated value of an adjustment parameter, in this case the position of the potentiometer tap 21.

As a further parameter p, which can be used instead of a defined adjusted delay effect with respect to the processes which are characterized from the reproduction of the picture on the reproduction screen, the duration $t_i$ of the individual pulses creating the measuring mark M should be considered instead of the phase $\phi$. If, for example, the electronic camera is adjusted with respect to the supervised object in such a way that the picture D' of the dimension D to be determined directly coincides with a prescribed picture line on the reproduction screen, and if on this picture line the measuring mark M is written at the same time as a line with an adjustable length, only this line is to be adjusted in such a way that it nearly covers the picture D' of the dimension to be determined. In such a case, the length of the line is exactly the parameter p which, by using the equation (3) results in the dimension D which is to be determined.

In the following, a further possibility is considered, whereby two separate lines are written on the same picture line as measuring marks $M_1$ and $M_2$. These marks are adjusted in length in such a way that the dimension to be determined results from a distance of the facing ends of the two line-shaped or bar-shaped measuring marks $M_1$ and $M_2$.

In order to provide a pulse in the form of a line to the circuit containing one of the electron beams 2 or 12, respectively, the coupling member 9 (compare FIG. 4) can, for example) be connected with its side which is to be charged with the control pulses by way of a switch 22 and a series resistor 24 to a direct current voltage force 23. The switch, for example, a three- or four-pole thyristor, is now controlled by the pulses of a pulse generator 7. Thereby the switch 22 is to be controlled by two pulse sequences — in each case with the period $\pi - T_B$, but in a defined adjustable phase position between the pulses of the first pulse pulse sequence and the pulses of the second pulse sequence. The first pulse sequence activates the switch 22, while the second deactivates the switch. As long as the switch 22 is conductive, the current source 23 operates on the coupling member 9 and modulates the electron beam 2 or 12, with a light or a dark continuous line, depending on the polarity of the current source 23 with respect to the electron beam to be modulated.

The above described technique is employed especially if the dimension D, for example the diameter of a melting zone during floating zone melting, is to be determined by means of two measuring marks $M_1$ and $M_2$ which are simultaneously applied. These measuring marks $M_1$ and $M_2$ are placed in position on the reproduction screen simultaneously in such a way that mark $M_1$ coincides with one end point and $M_2$ with the second end point of the picture D' of the (linear) dimension D. From the required position of the adjustment means, which are separately assigned to these measuring marks, and the values of the respective adjustment parameters $p_1$, $p_2$ or $p_{x1}$, $p_{y1}$ or $p_{x2}$, $p_{y2}$ describing this position, the required dimention D can be determined as shown above.

If there are two marks $M_1$ and $M_2$ with the respective adjustment parameter $p_1$ and $p_2$ and if $p_{01}$ and $p_{02}$ constitute the parameter value corresponding to the respective zero adjustment of these marks, and if finally the adjustment means of the measuring marks are identical so that $$\frac{ds_1}{dp_1} \text{ is always } \frac{ds_2}{dp_2}$$

wherein $ds_1$ is a small shifting of the mark $M_1$ and $dp_1$ is the respective change of the parameter $p_1$ and $ds_2$ is a small shifting of the mark $M_2$ and $dp_2$ is the respective change of the adjustment parameter $p_2$, so that the relationship $$D^1 = p_1(d_1) - p_{01} + p_2(d_2) - p_{02}$$

will result, wherein $p_1$ ($d_1$) constitutes the position of the adjustment parameter $p_1$ which is the coincidence of the measuring mark $M_1$ with the end point $d_1$ of the picture D', and $p_2$ ($d_2$) constitutes the position of the adjustment parameter $p_2$ which causes the coincidence of the measuring mark $M_2$ with the other end point of the picture D'. Base on the above described equation, the corresponding dimension D can be determined without major difficulties by means of the picture D'.

Figure 5:
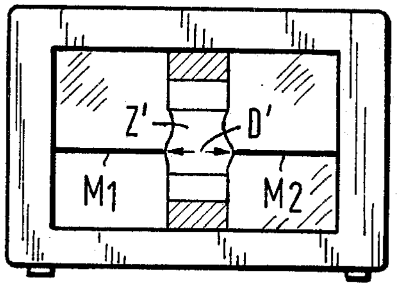
FIG. 5 is a pictorial representation of a picture screen of a recording unit, showing the profile of a molten zone in a semiconductor rod being processed according to the floating zone method and the position of measuring marks on the screen.

It is advantageous if both measuring marks $M_1$ and $M_2$ are guided as defined light or dark lines or bars from the respective edge of the picture from opposite directions onto the object which is to be supervised, as becomes apparent from FIG. 5. FIG. 5 illustrates the picture Z' of a melting zone which is supported between two vertically mounted rod parts, whereby it is merely important to determine the diameter D of the melting zone Z' or the diameter D' of the picture Z' of the melting zone, respectively, by means of the two measuring marks $M_1$ and $M_2$ which are designed as lines or edges. They are applied from the left and right to the picture Z' of the melting zone Z. The correct final position is provided if the ends of the measuring marks $M_1$ and $M_2$ facing each other just touch the profile of the molten zone at the point of the diameter D on the picture screen, as is illustrated in FIG. 5.

Figure 4:
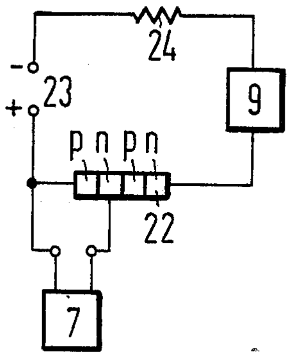
FIG. 4 is a schematic circuit diagram of apparatus for providing control pulses to the coupling member of the apparatus illustrated in FIGS. 1 and 2.
Figure 6:
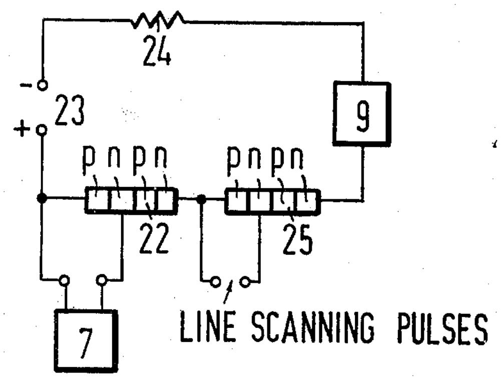
FIG. 6 is a schematic circuit diagram of apparatus for creating a pair of measuring marks.

For the creation of such measuring marks $M_1$ and $M_2$ a circuit may be employed which is similar to the circuit according to FIG. 4, as is illustrated in FIG. 6. The circuit contains a direct current source 23, a series resistor 24, the coupling member 9 creating the connection with the electron beam 2 or 12, respectively, and two three-pole electronic switches 22 and 25, for example thyristors, which are all connected in series with respect to the current source 23. The switch 22 is charged by a pulse source 7 in such a way that it is provided with two sequences of pulses which are shifted with respect to each other with the adjustable phase $\phi$ — in each case with the period $\pi - T_B$. The pulses of one sequence render the switch 22 conductive and the pulses of the other sequence reopen the switch. The second switch 25 is charged by pulses, which for example, are connected with the shifting of the electron beam 2 in or from a prescribed fixed line, for example the line $z_Q$ or cause the shifting themselves. The starting pulse for the line $z_Q$ should, for example, close the switch 25 and the subsequent pulse for shifting into the line $z_{Q+1}$ reopen the switch 25. Finally, a device is required which allows the spacing of the pulses operating the switch 25, on the one hand, and the pulses operating the switch 22, on the other hand, into a defined, adjustable phase relation. A counting member provides that the line shift pulses for the electron beam 2 only operate the switch 25 at the $z_Q$. Furthermore, the pulses of the pulse generating device 7 should, in this case, appear if the pulses operating the switching device 25 become effective, in other words when the electron beam 2 writes the line $z_Q$. With the exception of the time during which the line $z_Q$ is written, the circuit which is illustrated in FIG. 6 should be adjusted in such a way that the switch 25 is open; whereas, the switch 22 is closed. When the line $z_Q$ is activated, a closing pulse is supplied to the switch 25 to switch the current source 23 to the coupling member 9. This will result in a continuous current which either directly or, if the arrangement according to FIG. 6 is not coupled with the reproduction device but with the electronic camera 6, indirectly scans in the form of a continuous line, which is only interrupted during the opening of the switch 22 by an opening pulse created by the pulse generator 7. Therefore, the mark M is created. Since the pulse generation circuit 7 provides a second pulse after a time interval corresponding to the phase shifting, which now acts as a closing pulse to the switch 22, the same will be closed again so that the continuous current reoccurs and the Mark $M_2$ can be written. Finally, the shift pulse of the reproduction device switching off the line $z_Q$ will, in addition to its function in the reproduction device, open the switch 25 and thereby re-establish the original situation. It will again be interrupted if, during the writing of the following picture cycle, and the small $z_Q$ line is once more achieved.

The adjustment parameter p is hereby constituted by the phase angle $\phi$ between the pulses of the pulse generating device 7. It can be controlled, for example, by directing the opening pulses directly and the closing pulses by way of an adjustable delay circuit to the switch 22, or vice versa.

The fact that in common television devices the return of the electron beams 2 and 12 from the previous line into the following line is carried out when the electron beam 2 or 12, respectively, are switched off, makes it possible when using such devices to also write the measuring marks $M_1$, $M_2$ during the return phases. If the diameter of the melting zone picture is to be measured at the $\nu$ picture line the electron beam 2 is scanned during the return from the ($\nu - 1$) to the $\nu$ line from the into the ($\nu + 1$) line by the information creating the measuring mark M or the measuring marks $M_1$ and $M_2$ but not simultaneously by information concerning the picture of the object). In addition the flip-flop or shifting phases serving the return of the electron beam are maintain in case of a dimmed electron beam 2.

The basic thought of the above-described techniques resides in that simultaneously with the picture of the object to be supervised, two measuring marks $M_1$ and $M_2$ are created, being shiftable in a defined manner independently from each other across the electronic picture screen and are at the same time brought into coincidence with the respective end points of the picture D′ of the dimension D to be determined, in that the required adjustment therefor of the means determining the position of the measuring marks $M_1$ and $M_2$ on the screen is compared with the adjustment of these means, whereby during the application, the two measuring marks $M_1$ and $M_2$ would at the same time coincide with the end points of a calibration distance $s'$ — which is assigned to a known transverse s in the distance of the object from the recording optic of the electronic camera — on the picture screen, and in that from the result of this comparison the actual value of the dimension D is determined, preferably electronically.

An important further development of the present invention resides in a method for the control of a dimension D of an object which is to be supervised by way of a picture of the object which is recorded by an electronic camera and reproduced on an electronic picture screen, which is characterized in that at first the electronic camera is brought in such a position with respect to the object that the dimention D to be controlled is oriented transversely of the optical axis on the side of the object of the recording lens of the electronic camera, in that furthermore simultaneously with the picture of the supervised object, two measuring marks $M_1$ and $M_2$ are created which are shifted in a defined independently from each other on the electronic reproduction screen and are brought into coincidence at the same time with the terminal points of a distance corresponding to the desired value and the desired position of the picture D′ of the dimension D to be controlled, in that the adjustment means fixing the measuring marks $M_1$ and $M_2$ are maintained in the required position, and that finally deviations of the picture from the desired condition are registered automatically and are utilized for the control of a control process for reestablishing the desired condition.

As an explanation, for example, FIG. 5 and FIGS. 7–9 can be used, whereby the position of the measuring marks $M_1$ and $M_2$ shown in FIG. 5 correspond to the desired condition of the diameter D of the melting zone picture Z. If the diameter D′ of the melting zone picture changes, at least one of the measuring marks $M_1$, $M_2$ travels into the melting zone picture or a dark space is created between the measuring mark and the picture of the melting zone. This condition can be scanned, for example, by means of opto-electronic supervision devices and can be utilized for the operation of means which return the melting zone to the d esired condition.

In this case it is recommendable to light-scan the measuring marks $M_1$ and $M_2$ so that they show up in a light way in the dark surroundings of the melting zone Z. The picture Z of the light melting zone and the light measuring marks $M_1$ and $M_2$ then correspond to a high voltage or a strong current in the electron beam 2, respectively, and the picture of the dark surroundings to a low current. The current intensity along the $\nu$ line which is to contain the measuring marks $M_1$ and $M_2$ as well as the diameter D′ to be measured of the picture of the melting zone Z′ has, in that case for example, the current or voltage course, respectively, which becomes apparent from FIGS. 7–9 during the time t during the period duration $\tau_\nu$ which is assigned to the $\nu$ line.

Figures 7, 8, 9:
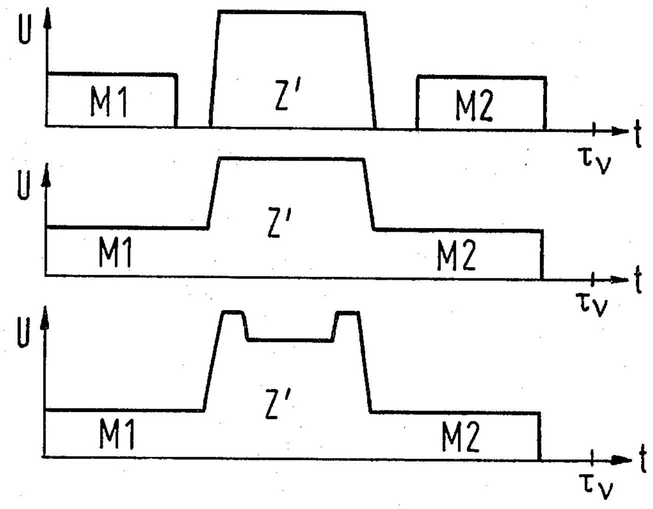
FIGS. 7–9 are graphic illustrations of measuring marks with respect to image production, provided to aid in understanding the invention.

This means that the information which is carried by the electron beam 2 due to the effect of the electronic recording camera 6, as well as the means creating the measuring marks $M_1$ and $M_2$, can be scanned in order to adjust the correct condition which is illustrated in FIG. 8. As long as this condition does not exist, there is a distinct current intensity, or voltage minimum, respectively, (FIG. 7) between the pulses of the measuring marks $M_1$ and $M_2$ and those of the picture of the melting zone Z′, or a considerable superelevation will exist at the edges of the picture of the melting zone (FIG. 9).

It should be mentioned that the measuring marks $M_1$ and $M_2$ can be simultaneously scanned on several neighboring lines of the television picture so that an edge or bar-like shape of the measuring marks is created. In order to achieve this shape, a pulse generator 7 is utilized in such a way that it releases pulse groups which are shifted by the period $\pi$ (which always reoccur with the period $T_B$) instead of the above-described individual pulses, so that the mechanism described by FIG. 6 can be used in several neighboring lines.

Finally, it is possible that the means scanning the parameters p or $p_x$ or $p_y$, respectively are connected with an electronic calculating unit in such a way that the calculating unit directly indicates the desired dimension D. It is thereby possible that the result released by the calculating unit is directly illustrated in the picture on the reproduction screen.

Although we have described our invention by reference to particular illustrative embodiments thereof, many changes and modifications may become apparent to those skilled in the art without departing from the spirit and scope of the invention. We therefore intend to include within the patent warranted hereon all such changes and modifications as may reasonably and properly be included within the scope of our contribution to the art.

We claim as our invention:

1. A method of optically monitoring the image of the melting zone of a semiconductor rod in a crucible free melting process comprising the steps of generating an electron beam, scanning the image with the electron beam (2, 12) under the control of line scanning pulses, modulating the electron beam with electrical pulses, for producing measuring marks M1, M2 representing the edges of the image, including controlling the beam with a beam control circuit, coupling the electrical pulses to the control circuit with a coupling circuit (9) and generating the electrical pulses with an auxiliary circuit which includes a pair of three-terminal semiconductor switches (22, 25) in series with the coupling circuit and a direct current voltage source (23) by applying switching pulses having an adjustable period to one of the three-terminal semiconductor switches (22) which switching pulses are equal to each other and shorter in duration than the scanning duration of one line, and applying the line scanning pulses to the other three-terminal semiconductor switch (25).

2. Apparatus for optically monitoring the image of the melting zone of a semiconductor rod in a crucible free melting process comprising means for generating an electron beam means for generating electrical pulses, a beam control circuit for controlling scanning the image including modulating means for modulating the beam with the electrical pulses to produce measuring marks M1, M2 representing the edges of the image, a coupling circuit (9) for coupling the electrical pulses from said pulse generating means to said beam control circuit, said pulse generating means including an auxiliary circuit including a pair of three-terminal semiconductor switches (22, 25) connected in series with said coupling circuit and a direct current voltage supply, means for applying adjustable period switching pulses to one of said semiconductor switches (22), said switching pulses being equal to each other and shorter in duration than the scanning duration of one line a source of the scanning pulses, and means for applying line scanning pulses to the other semiconductor switch (25).

* * * * *